(12) United States Patent
Lipka et al.

(10) Patent No.: US 11,555,881 B2
(45) Date of Patent: Jan. 17, 2023

(54) LOCATING METHOD FOR LOCALIZING AT LEAST ONE OBJECT USING WAVE-BASED SIGNALS AND LOCATING SYSTEM

(71) Applicant: FRIEDRICH-ALEXANDER-UNIVERSITÄT ERLANGEN NÜRNBERG, Erlangen (DE)

(72) Inventors: Melanie Lipka, Berg (DE); Erik Sippel, Tennenlohe (DE); Martin Vossiek, Fürth (DE)

(73) Assignee: FRIEDRICH-ALEXANDER-UNIVERSITÄT ERLANGEN-NÜRNBERG, Erlangen (DE)

( * ) Notice: Subject to any disclaimer, the term of this patent is extended or adjusted under 35 U.S.C. 154(b) by 83 days.

(21) Appl. No.: 17/258,550

(22) PCT Filed: Apr. 23, 2019

(86) PCT No.: PCT/EP2019/060386
§ 371 (c)(1),
(2) Date: Mar. 5, 2021

(87) PCT Pub. No.: WO2020/011413
PCT Pub. Date: Jan. 16, 2020

(65) Prior Publication Data
US 2021/0389411 A1    Dec. 16, 2021

(30) Foreign Application Priority Data
Jul. 10, 2018    (DE) .................... 10 2018 116 688.5

(51) Int. Cl.
*G01S 5/16*    (2006.01)
(52) U.S. Cl.
CPC ..................... *G01S 5/16* (2013.01)

(58) Field of Classification Search
CPC .................................. G01S 5/16; G01S 5/0294
See application file for complete search history.

(56) References Cited

U.S. PATENT DOCUMENTS

2014/0313071 A1 * 10/2014 McCorkle ............. G01S 13/106
342/202

FOREIGN PATENT DOCUMENTS

CA    2313485    * 11/1998

OTHER PUBLICATIONS

Särkkä et al., "Phase-Based UHF RFID Tracking With Nonlinear Kalman Filtering and Smoothing," IEEE Sensor J., vol. 12, No. 5, 2012.*
(Continued)

*Primary Examiner* — Catherine T. Rastovski
(74) *Attorney, Agent, or Firm* — Marshall, Gerstein & Borun LLP (57) ABSTRACT

The invention relates to a locating method for localizing at least one object using wave-based signals, wherein a wave field emanates from the object to be localized and the wave field emanating from the object is received by a number N of receivers, at least one measurement signal is formed in every receiver, said measurement signal being dependent on the spatial and temporal distribution of the wave field and the phase progression of said measurement signal being characteristically influenced by the signal propagation time from the object to the receiver, wherein, for position locating, phase values for each of the at least two measurement signals are taken as measured phase values, and wherein the current position (P(k)) of the object to be located at the time k is determined by a comparison of at least one linear combination of the measured phase values with at least one linear combination of the associated hypothetical phase values, which result from the transmitter-receiver distance(s), and using a recursive filter/estimator.

20 Claims, 2 Drawing Sheets

(56) References Cited

OTHER PUBLICATIONS

DiGiampaolo et al., Mobile Robot Localization Using the Phase of Passive Uhf Rfid Signals, *IEEE Transactions of Industrial Electronics*, 61(1):365-76 (Jan. 2014).

Martinelli, A Robot Localization System Combining RSSI and Phase Shift in UHF-RFID Signals, *IEEE Transactions on Control Systems Technology*, 23(5):1782-96 (Sep. 2015).

Särkkä et al., Phase-based UHF RFID Tracking with Nonlinear Kalman Filtering and Smoothing, *IEEE Sensors Journal*, 12(5):904-10 (May 2012).

* cited by examiner

LOCATING METHOD FOR LOCALIZING AT LEAST ONE OBJECT USING WAVE-BASED SIGNALS AND LOCATING SYSTEM

The invention relates to a locating method for localizing at least one object using wave-based signals in which a wave field emanates from the object to be localized and the wave field emanating from the object is received by a number N receivers. The wave field can both be emitted from the object itself and can be irradiated by an external source and reflect its wave.

Typical methods for wave-based localization are based on distance information from time of flight measurements (e.g. multilateration), time of light difference measurements (TDOA (time difference of arrival methods), angular measurements (e.g. multiangulation) from phase information, or a combination of a plurality of techniques. An overview of these well-known methods that are variously used for localization can be found, for example, in "*Wireless Local Positioning—Concepts, Solutions, Applications*" by Vossiek, M., Wiebking, L., Gulden, P., Wieghardt J. and Hoffmann C. and an example for the combination of the methods in "*A Bilateral 24 GHz Wireless Positioning System for 3D Real-Time Localization of People and Mobile Robots*" by Dobrev Y. and Shmakov D.

In the known methods, the relevant information (e.g. distance and/or angle from a further station) is respectively calculated by individual measurement instruments (stations) and the calculation of the position is done from this. Multilateration in which the distance is measured by means of a time of flight determination (e.g. by means of FMCW radar, as stated in "*Understanding Millimetre Wave FMCW Radar*" by Brooker G. M.) is named as an example here. An object, transponder, etc. can now be localized by the formation of a point of intersection of the circular segments for at least two (2D position) or three (3D position) spatially separate stations whose positions are known.

The wave-based measurement instruction will be called radar in the following. The fact that the methods shown can be performed with all wave shapes (e.g. electromagnetic, optical, or acoustic) is generally known in the professional world. The device for the reception of the signal is called an antenna in the following. The wave-based measurement instrument can, however, as is generally known in the professional world, be provided with any desired device that enables the reception of the wave (e.g. an antenna with electromagnetic waves; photodetectors or electrooptical mixers with optical waves; sound converters or microphones with acoustic waves).

The methods previously known from the prior art have some disadvantages, however. The disadvantages of the multiangulation method will be selected by way of example here.

The measurable angular range is limited to the uniqueness range of the arrangement;

Multipath propagations can have the result that the phase of a multipath is measured at the antennas and thus the angle is incorrectly estimated, which considerably falsifies the position;

If the angular measurement of a radar is evidently incorrect (e.g. because it greatly differs from the results of the other radars in a redundant system) and if the measurement result of this radar is therefore not used for the position determination, a phase value of this radar no longer contributes to the localization. That is, the phase values are not individually evaluated and thus all the phase values of the radar are also collectively dropped even if only a fraction of the phase values of the radar is responsible for this incorrect angular estimate;

Since the measurement space has to be scanned and since a hypothesis and a measurement have to be offset for every point, a high calculation effort is produced;

Since the antennas have to have a small distance (typically in the range of less than one wavelength up to a few wavelengths), crosstalk between the antennas arises, which causes interference.

An improved solution for a locating method is therefore sought that is able to overcome at least some of the above-listed disadvantages.

This object is achieved by a method in accordance with the features of claim 1. Advantageous embodiments of the invention are the subject of the dependent claims.

A location method is now proposed in accordance with the invention that determines or estimates the current position of an object directly from at least one preceding position of the object and from at least two phase values measured by at least one receiver, i.e. the position determination takes place recursively on the basis of an object position from the past. The basic requirement for this is that the object to be localized generates a corresponding wave field that propagates in the direction of at least one receiver. Such a receiver can then detect a measurement signal of the wave field with the aid of at least one reception antenna and at least one signal phase value can be taken from the signal phase progression of said measurement signal. On the one hand, the signal phase of the measurement signal measured by at least one receiver should be understood as a phase value in accordance with the claim; on the other hand, however, a phase value can also be understood as at least one value derived from a plurality of signal phases. Such a derived value can, for example, be the difference or sum of at least two signal phase values.

It is decisive for the at least two measured phase values used for the localization that a unique relationship between the signal phase and a signal time of flight between the transmitter/object and receiver or a signal time of flight difference can be established for both values. The dependence of the signal phase on the signal time of flight conversely means that the signal phase is also equally dependent on the distance between the object and the receiver. A hypothetical phase value can thus be determined from a hypothetical transmitter/object distance. On the basis of these mathematical relationships, the current distance between the object and the receiver and consequently the current position of the object relative to the receiver can be determined by comparison of the measured phase values with hypothetical phase values, with here at least one preceding position of the object being used as the starting point in the sense of a recursive procedure and the error between the measured and the hypothetical phase value being minimized as much as possible by adaptation of this position.

The comparison of at least two measured phase values with a corresponding number of hypothetical phase values is constructive for the multidimensional position determination. As already previously indicated, the phase values do not have to be directly compared with one another, but instead sums of or differences between measured phase values can be compared with corresponding sums or differences of hypothetical phase values. These options can be mapped by the use of corresponding linear combinations, i.e. a linear combination of available measured phase values is compared with a linear combination of hypothetical phase values. Accordingly, sums and/or differences of phase values weighted as desired and the phase values can be directly compared with one another by a suitable selection of the pre-factors of the linear combinations.

In this respect, the transmission phase of the object to be localized can also be recursively estimated. Information on the position of the object to be localized can thus be obtained, with the aid of the relationship between the distance and the phase, if the transmission phase of the object to be localized only varies slowly (or a known relationship exists).

The case that one or more or all of the pre-factors adopt the value of zero should also be understood as a linear combination within the framework of the present invention.

Only the fact is decisive that at least two measurement signals are available for a position estimate that have a stable phase relationship with one another. At least two measurement signals for a wave field and thus two phase values are typically detected for this purpose by at least two receivers or antennas spatially separate from one another. It can here, for example, bet a radar station having an antenna arrangement of at least two antennas. It can, however, likewise be two completely separate receivers. Ideally, $N_R$ receiver stations are available that each have up to N antennas. The number of antennas at each receiver station can be different and arbitrary here. In this case, up to N phase values are available in each receiver and are in a stable phase relationship with one another. $N_R$ sets of up to N phase values are therefore available in sum. With coherent transmitters, there is additionally also a stable phase relationship between the stations. An exact position estimate can then take place by forming suitable linear combinations between the available phase values by a comparison with the corresponding linear combinations of the hypothetical phase values.

The phase values do not, however, necessarily have to originate from spatially separate receivers. It is conceivable that the at least two phase values result from taking from the measurement signal at different times. A position estimate with only one receiver is also conceivable for this case. The at least two measured phase values can also result from measurement signals having different frequencies, i.e. wave fields having different frequencies therefore emanate from the object, which allows the measurement of at least two phase values for the measurement signals having difference frequencies at the receiver side. Combinations of these methods can furthermore be used.

The propagation of the wave field from the object in the direction of the at least one receiver can be caused in that the object to be localized scatters or reflects a wave irradiated elsewhere at a position P to be detected. Alternatively, directly at the location P, the object to be localized can have a radio device or transmission device that irradiates a corresponding transmission signal. It is equally possible that the object itself emits, for example, thermal radiation or a radio emission in the form of a wave.

If a wave field having different frequencies emanates from the object, this is produced by a corresponding non-linearity of the object in the reflection or by the non-linear characteristic of the integrated radio device or transmission device of the object.

A transmitter, for example, emits a wave field having a frequency f0. The object to be localized thereupon generates a wave field as the response that comprises multiples of the frequency f0 due to the non-linearity of the object. The phase values of the different frequencies are then measured by one or more receivers and subjected to the aforesaid evaluation methods.

The wave field initially emanating from the transmitter has at least one frequency, preferably at least two frequencies (f1; f2; f3; . . . ; fn). Multiples (n1*f1; n2*f2; n3*f3; . . . ; nn*fn) and intermodulation products (n1*f1+n2*f2+ . . . +nn*fn; . . . ) are produced by the non-linearity of the object to be localized and their phase values are measured by the at least one receiver. It is equally conceivable that the wave field emanating from the transmitter comprises at least one frequency, preferably at least two frequencies (f1; f2; f3; . . . ; fm), but the object to be localized generates the frequency/frequencies (fm+1, . . . , fn) itself and produces multiples and intermodulation products due to its non-linearity whose phase values are measured.

It is possible to eliminate any information on the transmission phase by the use of linear combinations and a skillful selection of the pre-factors used there. No information on the coherence from the received signals to the transmission signals thereby have to be present for the presented method in accordance with the invention if a phase can be derived from at least two spatially separate signals.

The device for the reception of the signal is called an antenna in the following. The wave-based measurement instrument can, however be provided with the suitable device that enables the reception of the wave (e.g. an antenna with electromagnetic waves; photodetectors or electrooptical mixers with optical waves; sound converters or microphones with acoustic waves) in dependence on the wave type used.

If ideal measurement values for the phase values are assumed, the comparison between measured phase values and hypothetical phase values would have to result in hundred percent agreement on an assumption of the exact object position, i.e. the difference between the measured and the hypothetical phase would have to result in zero with an exact position of the object used as the basis for the calculation of the hypothetical phase. Since, however, the measurement values have noise values superposed, differences of the measurement values can occur here. To avoid this problem, it is proposed in a preferred embodiment of the invention that a suitable penalty function is used for the comparison of the linear combinations to minimize the sum of the resulting differences, in particular for every single comparison of linear combinations. This is done by recursive estimators/filters. In this respect, in accordance with the recursive procedure, a start is made from the last known point of the object to be detected and the current position is determined by recursive statistical or filter processes and with the aid of the compared phase values.

It is conceivable to allow one or more movement models for the object and/or sensor value to enter into the recursive estimator/filter, in particular an inertial sensor system and/or a double evaluation for the object.

A quadratic function (least square) can be used, for example, as a suitable penalty function for the recursive position estimate. A known system for least square minimization is a so-called extended Kalman filter. The Kalman filter starts, for example, from the last known state, i.e. the last known position of the object. Using the last known state, a new state is pre-estimated that is compared with the measured phase values and linear combinations thereof and is optimized using the mathematical relationships. A consideration of any speed components of the object and corresponding covariances is also conceivable here to optimize the pre-estimate.

In accordance with a preferred embodiment, a so-called Kalman gain that is a measure of how much the pre-estimate and the measurement is respectively trusted can be calculated for every linear combination of the hypothetical and/or measured phase values. In the next step, the comparison of measured values and state values of the pre-estimate then takes place, with the pre-estimated position, for example, being converted into the corresponding hypothetical phase values for this purpose and with the differences for all the possible linear combinations per receiver, i.e. each antenna combination, being formed analogously to the measurement vector, for example. Subsequently, the pre-estimate of the position that has taken place and optionally the covariance matrix is corrected with the aid of the measured phase values and optionally while considering the Kalman gain to obtain the new position of the object on this basis.

To enable a correction symmetrically in all directions, the corresponding phases are mapped to a specific value space with the aid of a modulo operation.

An initial start value can, for example, be assumed for the first measurement point, i.e. without a previously known position value. It is likewise conceivable to select an initial start value on the basis of another location method or to start simultaneously from a number of start points and to then select the best solution.

Alternatively to the use of an extended Kalman filter for the recursive position estimate, a pseudo linear filter can likewise be used. There is also the possibility of performing the recursive position estimate on the basis of a gradient based search or also of a brute force search.

It is likewise conceivable that the method is carried out iteratively for a position to be estimated in that the method is carried out several times after one another for one single measurement point to thus approximate the best estimate of the position more and more.

The method in accordance with the invention is in particular usable for all wave-based sensors in which there is a relationship between the distance between the transmitter and the receiver and also the phase. It plays no role here whether they are coherent signals (e.g. by the pure reflection with secondary radar) or also incoherent signals (e.g. primary radar, in accordance with the LPR principle or radio buoys).

The method in accordance with the invention is in particular usable in the near field of antenna arrangements (arrangements of antennas that have a stable phase relationship with one another and whose phases can thus be evaluated with respect to one another). The near field is here in this respect defined as the area in the proximity of the antenna arrangement in which a spherical wave emitted by the object cannot be approximated over the total geometrical propagation of an antenna arrangement as a plane wave. The near field is often called a Fresnel region in the literature in which the Fresnel approximation applies, but not the Fraunhofer approximation. The far field is often called the Fraunhofer region. The Fraunhofer approximation applies here.

The method can preferably also be used for the localization of emitting objects whose signal is not in a deterministic frequency and phase relationship with a comparison signal in a receiver unit, i.e. the transmission carrier signal is as a rule not coherent with the receiver carrier signals so that the received signal phases initially do not allow any conclusion on the distance between the transmitter and the receiver on the basis of this incoherence.

If, however, it is preferably assumed that there is only one constant phase offset and/or one frequency offset, i.e. a linearly varying phase offset and/or another deterministic time dependent phase relationship between the transmission carrier signal and the receiver carrier signals, it is advantageously possible likewise to estimate this determinism with an expansion of the method in accordance with the invention and thus to improve the localization. For systems whose transmission and reception signals are incoherent, but the phase difference between the transmission and receiver $\Phi_s$, however, correlates for measurements at different times, it is advantageous to estimate it. If a plurality of mutually incoherent radio receivers are used, a separate unknown phase term $\Phi_{s,n_p}$ is produced for every station.

In addition to the method in accordance with the invention, the present invention additionally relates to a localization system comprising at least one receiver for the position localization of at least one object, with the receiver having means to perform the method in accordance with the present invention. The localization system is obviously accordingly characterized by the same advantages and properties such as have already been shown above with reference to the method in accordance with the invention. A repeat description is accordingly not necessary.

It is pointed out at this point that the terms "a" and "one" do not necessarily refer to exactly one of the elements, even though this represents a possible embodiment, but can also designate a plurality of elements. The use of the plural equally also includes the presence of the element in question in the singular and, conversely, the singular also includes a plurality of the elements in question.

The wavelength of the wave-based signal or signals is preferably smaller than the maximum distance of two points within the space in which the object to be localized is to be localized. It is furthermore of advantage if the maximum distance of two points within the space in which the object to be localized is to be localized is larger than the largest uniqueness region that results from the linear combinations that are evaluated by the recursive filter/estimator.

Further advantages and properties of the invention will be explained in more detail with reference to individual embodiments. There are shown.

A few principles of position recognition will first be looked at in the following that are inter alia relevant to classical multiangulation. These principles partially also form the basis for the representation of the idea in accordance with the invention.

Figure 1:
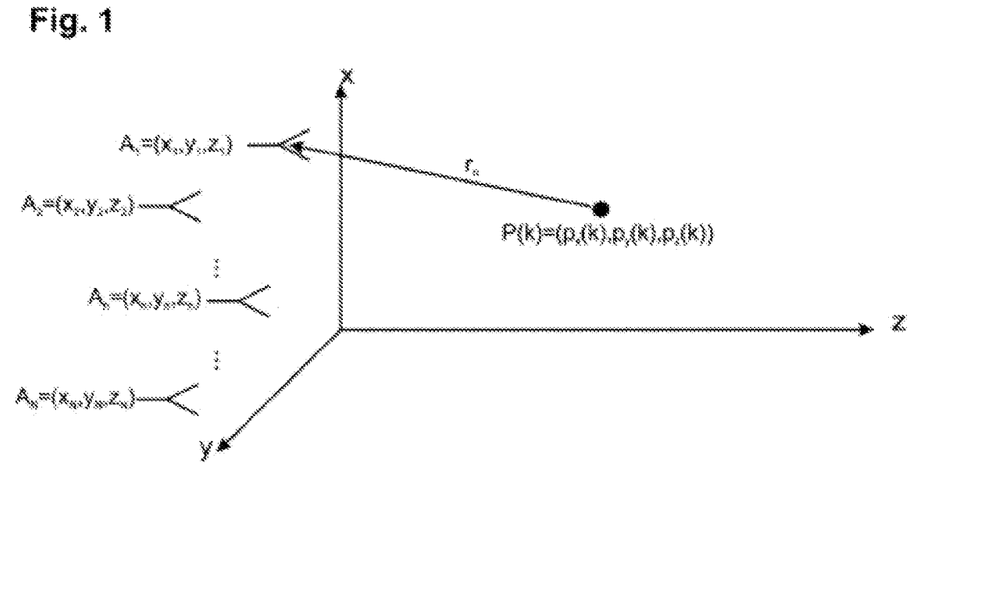
FIG. 1: a measurement situation with a moving object 1 at the position P(k) and N receivers or measurement points.

A possible recording situation for the measurement data is shown in FIG. 1. The position P(k) of the moving object 1 should be detected at the time k. N sensors or measurement points are used for this purpose.

The data recording takes place such that a signal is emitted in the direction of the antennas $A_n$ from the point P(k) at the time k. The emission of the signal can be invoked in that the object scatters or reflects a wave irradiated elsewhere at the point P(k) (for example, the wave can originally be irradiated ro one of the antennas $A_n$) or in that a radio transmission device is located at the location P(k) or in that the object radiates a wave itself—e.g. thermal radiation or a radio emission.

The emitted signal is received at the N measurement positions $A_n=(x_n, y_n, z_n)$ where $n=1, 2 \ldots, N$. Let the position of an object to be determined be $P(k)=p_x(k), p_y(k), p_z(k))$.

The following simplifications are assumed for a more compact representation:

- The object dwells within a spatial region that is selected such that the signal from the object can be detected from every position $A_n$
- The behavior of the antennas is assumed as uniform and direction-independent or a calibration was carried out to be able to compensate a non-uniform and direction-dependent behavior by suitable methods.
- The transmission channel is first assumed in simplified terms as an ideal AWGN channel, that is the received signal results as an amplitude weighted and time delayed version of the signal that emanates from the object. The interference n(t) superposed on the channel should be modeled as additive white Gaussian noise.

Said simplifications are not decisive for the function of the inventive method, but rather serve the clarity of the representation. The received signal at the antenna n under these assumptions can be expressed as $$e_n(t)=\alpha_n \cdot s(t-\tau_n)+n(t),$$

where:

$\alpha_n$ is the characteristic damping constant for the measurement path from $A_n$ to $P(k)$ $\tau_n$ is the characteristic signal time of flight for the direct path from $P(k)$ to the antenna position $A_n$ (i.e. the signal time of flight of the shortest path, also called the line of sight—LOS)

$s(t-\tau_n)$ is the signal that emanates from the object and is delayed by $\tau_n$ by the path between the object and the receiver If the equation is transformed into the frequency range $$E_n(\omega)=\alpha_n \cdot S(\omega) \cdot e^{-i\omega\tau_n}+N(\omega)$$

results.

The time of flight from the point $P(k)$ to an antenna position $A_n$ is calculated in accordance with:

$$\tau_n(k) = \frac{r_n(k)}{c} \; mit \; r_n(k) = \sqrt{(p_x(k)-x_n)^2+(p_y(k)-y_n)^2+(p_z(k)-z_n)^2},$$

where c is the propagation speed of the wave.

The phase of the received signal is composed of the term $e^{-i\omega\tau_n}$ that is dependent on the distance between the object and the antenna n and a portion through the signal that emanates from the object $S(\omega)$. If the signal is expressed by:

$$S(\omega)=\alpha_s \cdot e^{-j\Phi_s},$$

where $\alpha_s$ is the amplitude and $\Phi_s$ is the phase of the signal emanating from the object, the received phase at the antenna n results as:

$$\varphi_n=\text{mod}'_{2\pi}(-\omega\tau_n-\Phi_s),$$

where i $\text{mod}'_{2\pi}(\varphi)$ maps the phase $\varphi$ to $[-\pi,\pi]$, that is $$\text{mod}'_{2\pi}(\varphi) = \begin{cases} \text{mod}_{2\pi}(\varphi) & \text{for } \text{mod}_{2\pi}(\varphi) < \pi \\ \text{mod}_{2\pi}(\varphi) - 2\pi & \text{for } \text{mod}_{2\pi}(\varphi) > \pi \end{cases}.$$

$\Phi_s$ can be known here, e.g. when the radar transmits and the object only reflects or the object transmits a coherent response. It is, however, also possible that this phase term is unknown, e.g. when it is an active transponder having a separate local oscillator (whose phase is not known) or when an asynchronously transmitting beacon serves as a transmitter.

Figure 2:
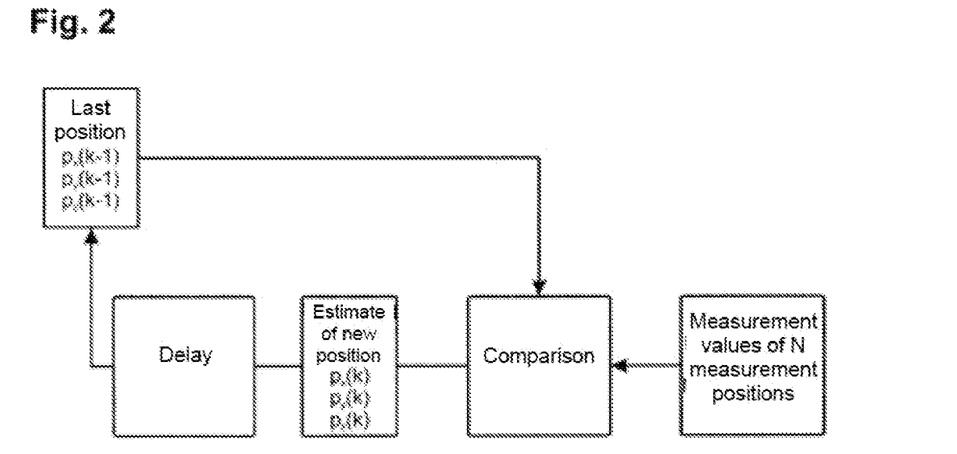
FIG. 2: a block diagram to illustrate the method procedure in accordance with the invention for the recursive determination of an object using a comparison of phase values.

A method is now proposed in accordance with the invention by which, as can be seen in FIG. 2, the current position $P(k)$ can be estimated directly from the last position and the measured phase values without a previous calculation/estimate of the angle of incidence being required, for example as with multiangulation.

The method will now first be explained with reference to a radio receiver having N antennas, but can be easily expanded to systems having a plurality of radars, with each radio receiver being able to have any desired number of antennas. The object now as before transmits a signal that is received with the aid of the N antennas so that now N mutually coherent received signals are present in the radar measurement system. Received signals are here deemed to be mutually coherent when they maintain a stable phase relationship with one another. On a use of $N_R$ radars, $N_R$ sets of mutually coherent responses are correspondingly present; with a coherently responding object, all the received signals of all the radars are mutually coherent.

As already mentioned in the prior art, the phase $\varphi_n$ of an electromagnetic wave is dependent on the time of flight ($\varphi_n=\text{mod}'_{2\pi}(-\omega\tau_n-\Phi_s)$) and thus on the distance ($\tau_n\sim r_n$) from the object to the antenna and the phase contribution $\Phi_s$ by the signal that emanates from the object (e.g. transmission signal or reflection at the object). The phase here is, however, only unique within one wavelength. To avoid the problem of ambiguity, the last position $(p_x(k-1), p_y(k-1), p_z(k-1))$ of the object or the last positions or a pre-estimate of the new position is also considered.

To now estimate the new position $(p_x(k), p_y(k), p_z(k))$, a respective set of N phase values $\varphi_1, \varphi_2 \ldots, \varphi_N$ is recorded at $N_R$ radio receivers. Any desired linear combinations of the phases with the hypothetical phases resulting from the transmitter/receiver distances from this can now be compared. $N_L$ linear combinations from the measured phase values $$b_{1,n_l}\varphi_1+b_{2,n_l}\varphi_2+\cdots+b_{N,n_l}\varphi_N$$

are formed for this purpose and are compared with the linear combinations of the associated hypothetical phases that are determined by the transmitter/receiver distances and the phase term $\varphi_s$ of the transmitting object as $$b_{1,n_l} \cdot \text{mod}'_{2\pi}\left(-\omega\frac{\sqrt{(p_x(k)-x_1)^2+(p_y(k)-y_1)^2+(p_z(k)-z_1)^2}}{c}-\Phi_s\right)+$$

$$b_{2,n_l} \cdot \text{mod}'_{2\pi}\left(-\omega\frac{\sqrt{(p_x(k)-x_2)^2+(p_y(k)-y_2)^2+(p_z(k)-z_2)^2}}{c}-\Phi_s\right)+\ldots+$$

$$b_{N,n_l} \cdot \text{mod}'_{2\pi}\left(-\omega\frac{\sqrt{(p_x(k)-x_N)^2+(p_y(k)-y_N)^2+(p_z(k)-z_N)^2}}{c}-\Phi_s\right).$$

$b_{n,n_l} \in \mathbb{R}$ here correspond to the arbitrarily selectable pre-factors of the nth phase value in the $n_l$th linear combination. They can accordingly adopt any value, including zero. It is easy to see that the pre-factors for the linear combination of the phases and the linear combination of the hypothetical phases have to be identical. The modulo operation $\text{mod}'_{2\pi}$ enables a comparison with the measured phase values since they are ambiguous. The operation can be replaced with any operation that maps the measured and the associated hypothetical phase values to the same numerical area so that measured and hypothetical values are comparable. Instead of comparing phase values with one another, the associated distances, time delays, etc. can naturally also be compared with one another.

Generally worded, the relationship between the phases measured without error and a hypothetical position for a linear combination $n_l$ can now be given as $$\sum_{n=1}^{N} b_{n,n_l} \mathrm{mod}'_{2\pi}(\varphi_n) = \sum_{n=1}^{N} b_{n,n_l} \mathrm{mod}'_{2\pi}\left(-\omega \frac{\sqrt{(p_x(k)-x_n)^2 + (p_y(k)-y_n)^2 + (p_z(k)-z_n)^2}}{c} - \Phi_s\right). \quad (1)$$

The left part here includes the linear combinations from the measured phase values, with the right part showing the associated hypothetical linear combinations of the phases resulting from the transmitter/receiver distances. The transmission phase $\Phi_s$ is here also included that can be unknown depending on which kind of object (e.g. transponder, passive reflection, etc.) the wave field emanates from.

If the measurement of the phase values $\varphi_n$ were error free, the point could now be found at which the difference of the two sides of equation (1) produces zero. Since the measurements of the phases $\varphi_n$ are generally swapped over, the selected linear combinations have to be evaluated with the aid of a suitable penalty function Pe(•), see "Convex Optimization", pages 294-300, by Boyd S. and Vandenberghe L. To now estimate the location $(p_x(k), p_y(k), p_z(k))$, it is selected such that the sum of the penalty functions is minimized for all the linear combinations:

$$\min_{p_x(k), p_y(k), p_z(k), \Phi_s} \sum_{n_l=1}^{N_l} Pe\left(\mathrm{mod}'_{2\pi}\sum_{n=1}^{N}\left(b_{n,n_l}\varphi_n - b_{n,n_l}\left[-\omega\frac{\sqrt{(p_x(k)-x_n)^2 + (p_y(k)-y_n)^2 + (p_z(k)-z_n)^2}}{c} - \Phi_s\right]\right)\right). \quad (2)$$

In the optimization function, the modulo operation $\mathrm{mod}'_{2\pi}(\cdot)$ before the subtraction of the linear combinations provides that the object to be localized can be displaced uniformly in all the directions around the last location $(p_x(k-1), p_y(k-1), p_z(k-1))$. The unknown phase term $\Phi_s$ also has to be estimated here or eliminated by skillful selection of the pre-factors $b_{n,n_l}$. It can be useful here also to estimate the unknown phase term $\Phi_s$. $\Phi_s$ can, for example, be produced by the transmission phase of the object to be localized. If it only varies slowly or if another known relationship exists, it can be used to increase the localization accuracy. The function to be minimized can here be produced from the sum of the penalties of any number of linear combinations. The skilled person knows that the minimization can be changed as desired to enable an efficient evaluation. The modulo operation can thus take place at different points in dependence on the factors $b_{1,n_l}, b_{2,n_l}, \ldots, b_{N,n_l} \in \mathbb{R}$. The evaluation of the sum is furthermore linear and can therefore be carried out in any desired order.

The skilled person generally knows that sums and differences of phase values can also be formed by means of multiplications or divisions of complex numbers. It can in particular be advantageous to calculate sums and differences of phase values $\varphi_n$ in that received signals $e_n(t)$ are multiplied by one another or are conjugately complexly multiplied or received signals are fragmented into a contribution portion and a phase portion in accordance with $e_n(t) = |e_n(t)|^* \exp(j \cdot \arg\{e_n(t)\})$ and only the phase portions of the complex signal, that is $\exp(j \cdot \arg\{e_n(t)\})$, are multiplied by one another or are conjugately complexly multiplied or divided. In accordance with the previously described operation, a phase value or sums and/or differences of phase values can be determined for every time point t. To determine the current position P(k) of the wave source, a search is now carried out for the current position in the environment of a position determined from a previous measurement, preferably in the environment of the last position, such that the point is found at which the penalty in accordance with relationship (2) becomes minimal. Since the measurement is superposed by interference variables, the sum of the penalty functions can be minimized with the aid of e.g. a least square search, gradient methods, brute force methods, etc.

The method presented here is in particular characterized in that it can be easily expanded by any desired further criteria, e.g. in that equation (2) is expanded by a penalty function that includes the criterion. The combination with movement models, the merger with other sensors, or double evaluations, etc. can thus be included in the penalty function. Alternatively, a filtering subsequent to the position estimate is also possible. The penalty function can furthermore also be evaluated at a plurality of frequencies.

The pre-factors for the respective linear combinations can here, as already mentioned, first be selected as desired, but a suitable selection will be looked at at this point for the two cases that occur (object transmits incoherently or coherently to the receiver).

For coherent systems, the phase term $\Phi_s$ is known and the relationship from (1) can therefore be set up such that only one pre-factor $b_{n,n_l}$ adopts a value not equal to zero, that is the sum is omitted in full.

$$b_{n,n_l} \cdot \mathrm{mod}'_{2\pi}(\varphi_{n,koh}) = b_{n,n_l} \cdot \mathrm{mod}'_{2\pi}\left(-\omega \frac{r_n}{c} - \Phi_s\right), \text{ where}$$

$$r_n = \sqrt{(p_x(k)-x_n)^2 + (p_y(k)-y_n)^2 + (p_z(k)-z_n)^2}.$$

Exactly N independent linear combuations thereby result with the error function $$\min_{p_x(k), p_y(k), p_z(k)} \sum_{n_l=1}^{N} Pe\left(\mathrm{mod}'_{2\pi}\left(b_{n,n_l}\varphi_n - b_{n,n_l}\left[-\omega\frac{\sqrt{(p_x(k)-x_n)^2 + (p_y(k)-y_n)^2 + (p_z(k)-z_n)^2}}{c} - \Phi_s\right]\right)\right).$$

A suitable application case would, for example, be systems in which coherence is reached in that the object reflects the signal or transmits a coherent signal without delay. In these so-called "round trip time of flight" measurements, the signal covers the distance from the transmitter to the object and then back to the receiver, whereby the phase term $\Phi_s$ results from the time of flight of the transmission antenna to the object. The transmission antenna here does not have to be separate (bistatic), but can also correspond to the reception antenna (monostatic).

It is sensible for systems in which the transmission and reception signals are incoherent to respectively form the difference for two coherent reception channels such that the unknown phase term $\Phi_s$ remains. This is achieved in that the linear combinations are formed such that two pre-factors $b_{n,n_l} = -b_{m,n_l}$ are selected as not equal to zero depending on the linear combination.

$$b_{n,n_l} \cdot \mathrm{mod}'_{2\pi}(\varphi_n) - b_{n,n_l} \cdot \mathrm{mod}'_{2\pi}(\varphi_m) =$$
$$b_{n,n_l} \cdot \mathrm{mod}'_{2\pi}\left(-\omega\frac{r_n}{c}\right) - b_{n,n_l} \cdot \mathrm{mod}'_{2\pi}\left(-\omega\frac{r_m}{c}\right),$$

where $$r_n = \sqrt{(p_x(k) - x_n)^2 + (p_y(k) - y_n)^2 + (p_z(k) - z_n)^2}.$$

The error function then results as $$\min_{p_x(k), p_y(k), p_z(k)} \sum_{n_l=1}^{N_l} Pe\left(\mathrm{mod}'_{2\pi}\left(b_{n,n_l}\varphi_n - b_{n,n_l}\right.\right.$$
$$\left[-\omega\frac{\sqrt{(p_x(k)-x_n)^2 + (p_y(k)-y_n)^2 + (p_z(k)-z_n)^2}}{c}\right] - b_{n,n_l}\varphi_n + b_{n,n_l}\left[-\omega\frac{\sqrt{(p_x(k)-x_m)^2 + (p_y(k)-y_m)^2 + (p_z(k)-z_m)^2}}{c}\right]\right)\right).$$

The explicit calculation/estimate of the unknown phase is saved by this skillful sum formation and computing power is thus saved. It would alternatively be possible to also estimate the phase terms $\Phi_s$ for every measurement point. The phase differences of antenna pairs can also be evaluated for coherent systems to e.g. increase the unique range with respect to the phase.

It is easily understandable for the skilled person that apart from these two recommendations all possible combinations are possible in the sum formation in which at least two (2D position estimate) or three (3D position estimate) penalty functions can be formed so that the resulting equation system is completely determined.

Advantages of the method in accordance with the invention:

The noise on the phases can be assumed as of Gaussian distribution so that typical metrics (e.g. least square) of efficient filters (e.g. Kalman filter) correspond to the optimum estimators
  The phase reacts extremely sensitively to changes in the distance so that high accuracies can be achieved
  The sensitivity and unique range can be adapted to the measurement scenario by the adaptation of the antenna distances (with unchanging measurement rate)
  Since the system does not expect any plane waves, it can work in the near field of the antenna arrangements
  Can be evaluated both for coherent signals and for incoherent signals from the object
  Direct position determination from the phases; no processing intensive detour via the calculation of a beam shaper
  The phase values can be individually weighted to take account of incorrect measurements or poorer SNR on individual channels
  When the system works in the near field of the antenna arrangements and thus does not expect any plane waves, the robustness greatly increases over multipath propagation since it now effects random instead of structural incorrect measurements The above method was demonstrated here with reference to a plurality of reception channels (antennas) at a radar station. It is easily understandable for the skilled person that it is also possible to use one or more reception channels at different radar stations and/or at different times. Analog to the presented procedure, the phase/distance relationships here result on the basis of the different times of flight to the respective receiver positions.

In addition, when a phase relationship can be set up for different times, e.g. when a wave field emanates continuously from the object, the phase difference between two times can also be used. A double shift and thus the speed can then, for example, be derived from this change of the reception phase.

The invention presented here was presented with measured phases at different receivers. Exactly the same principle can equivalently be implemented on measured phases at different frequencies of the same receiver or any desired frequency/receiver combinations.

Figure 3:
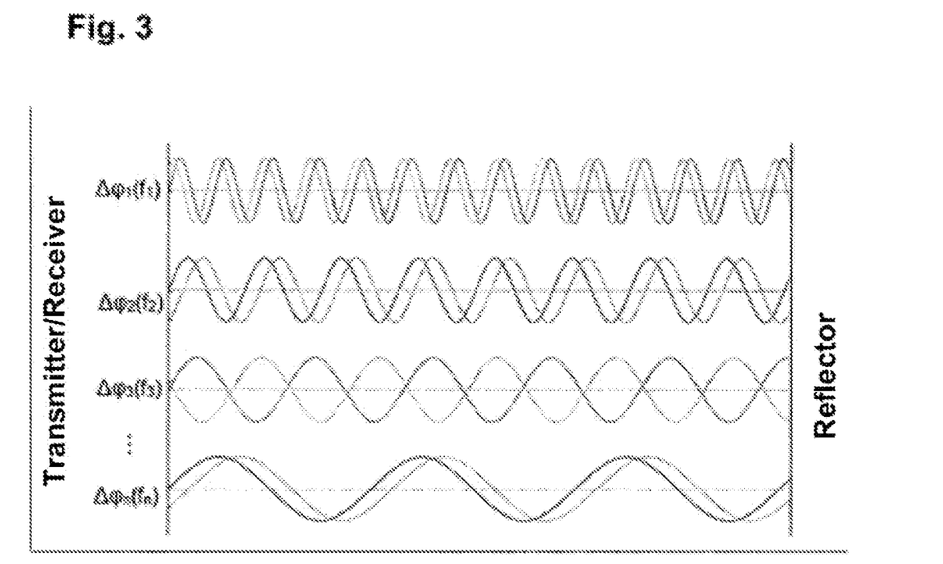
FIG. 3: a representation of measurement signals of different frequencies for a receiver.

The formula of the reception phase at antenna n at circular frequency $\omega_m = 2\pi f_m$ is again used to show this $$\varphi_{n,m} = \mathrm{mod}'_{2\pi}(-\omega_m \tau_n - \Phi_s).$$

It can be seen that with an unchanging distance and thus an unchanging delay $\tau_n$, the measured phase varies in dependence on the circular frequency $\omega_m = 2\pi f_m$. This is shown in FIG. 3. Measured phases at different frequencies can consequently also be used in equation (2). Phases of different frequencies at different antennas can furthermore also be used.

The measurement of the phases at different frequencies can be applied to a plurality of already existing systems. They include all multi-carrier methods such as orthogonal division multiplexing (OFDM), discrete multitone (DMT), multi-continuous wave (multi CW), and frequency shift keying (FSK) or minimum shift keying (MSK) systems in which individual CW signals are transmitted at different frequencies. The information of the channel estimate can already be used for localization here in existing infrastructure such as communication systems. The phases of different frequencies and at different antennas of the channel estimate that has already taken place can thus e.g. be used in massive MIMO systems to localize cellular radio subscribers. The phases of a plurality of communication procedures on different frequencies (e.g. wireless LAN on the 2.4 GHz band and on the 5 GHz band can be evaluated with respect to one another. The phases of the output signal of filter banks can furthermore be used for localization.

A further application possibility is represented by so-called "harmonic radar" systems. A signal is here emitted by a transmitter at one or more frequencies. It is reflected by an object to be localized or is received by a transponder as an object to be localized that has a non-linear behavior. A mixing or simplification process takes place by this non-linearity by which signal portions are produced at different frequencies than the transmission frequency.

If, for example, a transmitter is assumed that transmits a frequency (f0), signal portions at multiples of the transmission frequency (n*f0) are produced by the nonlinear characteristic.

If instead a transmitter is assumed that transmits a plurality of frequencies (f1, f2, f3, . . . , fn), the multiples of these frequencies (n1*f1; n2*f2; n3*f3; . . . ; nn*fn) and intermodulation products are produced (n1*f1+ n2*f2+ . . . +nn*fn, where n1, . . . , nn are whole numbers (−∞, . . . −1, 0, 1, . . . , ∞) and do not have to be identical). Hybrid systems are also possible here in which the frequencies (f1, f2, f3, . . . , fm) are transmitted and (fm+1, . . . , fn) are produced at the transponder of the object itself from which mixing and intermodulation products are correspondingly produced.

A wave field having signal portions at the generated frequencies now emanates from the object to be localized or from its transponder. It is measured by the receiver and phase values at these frequencies are determined.

The phases at these different frequencies in turn have a fixed, distance dependent phase relationship to one another and, in the coherent case, also to the transmitter. The method in accordance with the invention can therefore be used for the evaluation of the phases. It is also possible to use phases of different frequencies at different antennas and/or times.

A case will now be shown in the following using which the method was developed, tested, and verified. The measurement structure comprises U (where u=1, 2, . . . , U) FMCW secondary radars respectively with N (where n={1, 2, . . . , N}) antennas and a transponder that responds coherently to the signals of the radar devices. The demodulation of the N received signals of a station takes place by means of a local oscillator, that is coherently with one another; all the unwanted phase offsets that result due to cables, etc. were determined by a calibration and eliminated by calculation.

$$s_{RXu,n} = A_{RX,u,n} \cdot \cos(2\pi\mu\tau_{LOS,u,n}t + 2\pi f_0 \tau_{LOS,u,n} + \phi).$$

therefore applies to the base band signal in a reception channel of the FMCW radar Where:

$A_{RXp,n}$: amplitude of the base band signal (received by antenna No. n in radar No. u)

μ: sweep rate (defined in an FMCW radar, as familiar to the skilled person, as sweep bandwidth/sweep duration)

$\tau_{LOS,un}$: time of flight for the direct path from the transponder to the antenna No. n in radar No. u (line of sight)

$f_0$: carrier frequency of the radar (here 24 GHz)

φ: unknown phase term (caused e.g. by the unknown oscillator phase in the transponder, times of flight in the transponder, etc.) that is identical for all the channels of a radar $$\varphi_{u,n} = 2\pi f_0 \tau_{LOS,u,n} + \phi.$$

therefore applies to the phase at an antenna n in the radar u.

Since the phase term φ is not known in this case, the pairs for the comparison are formed in that the phase values for two respective antennas (index n,m∈{1, . . . , N} where n≠m) are deducted from one another:

$$\varphi_{u,n} - \varphi_{u,m} \leftrightarrow r_{u,n} - r_{u,m}$$

Every possible combination is now preferably formed, whereby, in accordance with the Gaussian sum formula, a number of (N·(N−1)/2) phase differences ($\Delta\varphi_{u,n,m} = \varphi_{u,n} - \varphi_{u,m}$) results per radar if it has N reception antennas; said phase differences are combined for all U radars to form a measurement vector.

$$\begin{pmatrix} \Delta\varphi_{1,1,2} \\ \vdots \\ \Delta\varphi_{1,n,m} \\ \vdots \\ \Delta\varphi_{1,(N-1),N} \\ \Delta\varphi_{2,12} \\ \vdots \\ \Delta\varphi_{2,n,m} \\ \vdots \\ \Delta\varphi_{2,(N-1),N} \\ \vdots \\ \Delta\varphi_{U,1,2} \\ \vdots \\ \Delta\varphi_{U,n,m} \\ \vdots \\ \Delta\varphi_{U,(N-1),N} \end{pmatrix}$$

Figure 4:
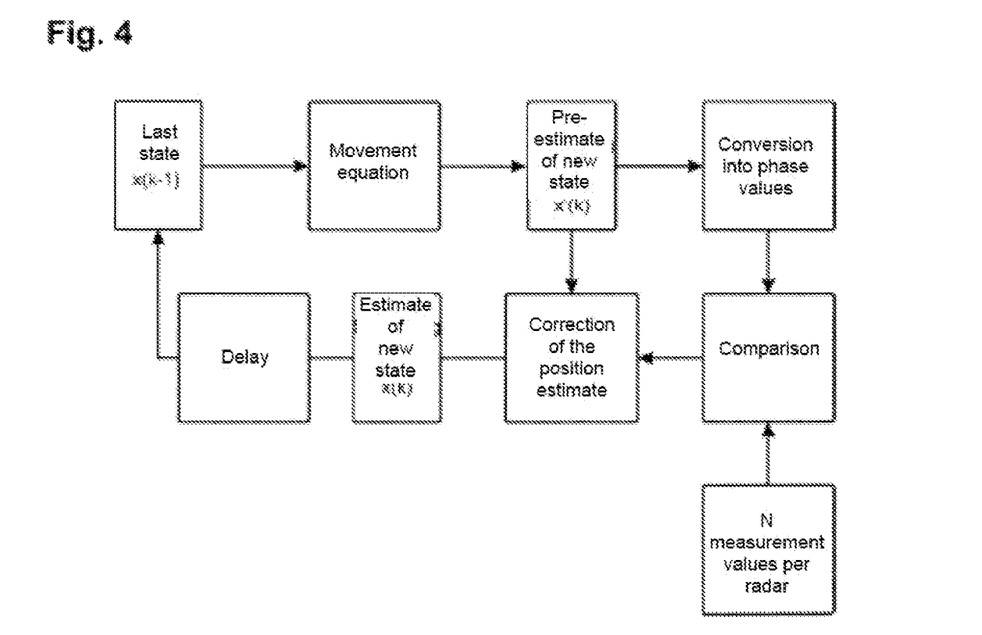
FIG. 4: a block diagram for the recursive position estimate with the aid of a Kalman filter.

An extended Kalman filter in accordance with FIG. 4 is now used for the calculation of the new position. A general description of extended Kalman filters can be found on pages 1-7 in "Lecture Notes Estimate II" by Reid I. and Term H., to which reference is explicitly made at this point. The last state (x(k−1)), comprising the position ($p_x(k-1)$, $p_y(k-1), p_z(k-1)$) and the speed components ($v_x(k-1)$, $v_y(k-1)$, $v_z(k-1)$) and the covariance thereto (P(k−1)) are sufficiently known.

The following steps are now carried out in the extended Kalman filter:

First, a pre-estimate for the new state and the covariance is calculated using the last state and a simple movement equation. It is also called a "predict":

$$x'(k) = \begin{pmatrix} p'_x(k) \\ p'_y(k) \\ p'_z(k) \\ v'_x(k) \\ v'_y(k) \\ v'_z(k) \end{pmatrix} = F \cdot x(k-1), \text{ where}$$

$$F = \begin{pmatrix} 1 & 0 & 0 & \Delta T & 0 & 0 \\ 0 & 1 & 0 & 0 & \Delta T & 0 \\ 0 & 0 & 1 & 0 & 0 & \Delta T \\ 0 & 0 & 0 & 1 & 0 & 0 \\ 0 & 0 & 0 & 0 & 1 & 0 \\ 0 & 0 & 0 & 0 & 0 & 1 \end{pmatrix};$$

$$P'(k) = F \cdot P(k-1) \cdot F^T + Q.$$

Where:

ΔT: time interval of the two measurement points

Q: covariance matrix for the calculation of the pre-estimate or predict x'(k): state vector for the predict of the state x(k−1): state vector for the last state F: matrix shape of the movement equation P(k−1): covariance matrix of the last state P'(k): predict of the new covariance matrix The so-called Jacobi matrix (H(k)) is now formed in that the relationships for the phase differences:

$$\Delta\varphi_{u,n,m} = 2\pi f_0\left(\frac{r_{u,n} - r_{u,m}}{c}\right), \text{ where}$$

$$r_{u,n} = \sqrt{(p_x(k) - x_{u,n})^2 + (p_y(k) - y_{u,n})^2 + (p_z(k) - z_{u,n})^2},$$

are derived after the entries of the state vector.

$$\frac{\delta\Delta\varphi_{u,n,m}(k)}{\delta p'_x(k)}; \frac{\delta\Delta\varphi_{u,n,m}(k)}{\delta p'_y(k)}; \frac{\delta\Delta\varphi_{u,n,m}(k)}{\delta p'_z(k)};$$

$$\frac{\delta\Delta\varphi_{u,n,m}(k)}{\delta v'_x(k)} = 0; \frac{\delta\Delta\varphi_{u,n,m}(k)}{\delta v'_y(k)} = 0; \frac{\delta\Delta\phi_{u,n,m}(k)}{\delta v'_z(k)} = 0.$$

therefore results for the entries of a line of the Jacobi matrix:

A line of the Jacobi matrix results for every phase difference. H(k) is thus:

$$H(k) = \begin{bmatrix} \frac{\delta\Delta\varphi_{1,1,2}(k)}{\delta p'_x(k)} & \frac{\delta\Delta\varphi_{1,1,2}(k)}{\delta p'_y(k)} & \frac{\delta\Delta\varphi_{1,1,2}(k)}{\delta p'_z(k)} & 0 & 0 & 0 \\ \vdots & \vdots & \vdots & \vdots & \vdots & \vdots \\ \frac{\delta\Delta\varphi_{1,n,m}(k)}{\delta p'_x(k)} & \frac{\delta\Delta\varphi_{1,nm}(k)}{\delta p'_y(k)} & \frac{\delta\Delta\varphi_{1,n,m}(k)}{\delta p'_z(k)} & 0 & 0 & 0 \\ \vdots & \vdots & \vdots & \vdots & \vdots & \vdots \\ \frac{\delta\Delta\varphi_{1,(N-1),N}(k)}{\delta p'_x(k)} & \frac{\delta\Delta\varphi_{1,(N-1),N}(k)}{\delta p'_y(k)} & \frac{\delta\Delta\varphi_{1,(N-1),N}(k)}{\delta p'_z(k)} & 0 & 0 & 0 \\ \frac{\delta\Delta\varphi_{2,1,2}(k)}{\delta p'_x(k)} & \frac{\delta\Delta\varphi_{2,1,2}(k)}{\delta p'_y(k)} & \frac{\delta\Delta\varphi_{2,1,2}(k)}{\delta p'_z(k)} & 0 & 0 & 0 \\ \vdots & \vdots & \vdots & \vdots & \vdots & \vdots \\ \frac{\delta\Delta\varphi_{2,n,m}(k)}{\delta p'_x(k)} & \frac{\delta\Delta\varphi_{2,n,m}(k)}{\delta p'_y(k)} & \frac{\delta\Delta\varphi_{2,n,m}(k)}{\delta p'_z(k)} & 0 & 0 & 0 \\ \vdots & \vdots & \vdots & \vdots & \vdots & \vdots \\ \frac{\delta\Delta\varphi_{2,(N-1),N}(k)}{\delta p'_x(k)} & \frac{\delta\Delta\varphi_{2,(N-1),N}(k)}{\delta p'_y(k)} & \frac{\delta\Delta\varphi_{2,(N-1),N}(k)}{\delta p'_z(k)} & 0 & 0 & 0 \\ \vdots & \vdots & \vdots & \vdots & \vdots & \vdots \\ \frac{\delta\Delta\varphi_{U,1,2}(k)}{\delta p'_x(k)} & \frac{\delta\Delta\varphi_{U,1,2}(k)}{\delta p'_y(k)} & \frac{\delta\Delta\varphi_{U,1,2}(k)}{\delta p'_z(k)} & 0 & 0 & 0 \\ \vdots & \vdots & \vdots & \vdots & \vdots & \vdots \\ \frac{\delta\Delta\varphi_{U,n,m}(k)}{\delta p'_x(k)} & \frac{\delta\Delta\varphi_{U,1,2}(k)}{\delta p'_y(k)} & \frac{\delta\Delta\varphi_{U,1,2}(k)}{\delta p'_z(k)} & 0 & 0 & 0 \\ \vdots & \vdots & \vdots & \vdots & \vdots & \vdots \\ \frac{\delta\Delta\varphi_{U,(N-1),N}(k)}{\delta p'_x(k)} & \frac{\delta\Delta\varphi_{U,(N-1),N}(k)}{\delta p'_y(k)} & \frac{\delta\Delta\varphi_{U,(N-1),N}(k)}{\delta p'_z(k)} & 0 & 0 & 0 \end{bmatrix}$$

for all U radars together.

The so-called Kalan gain K is subsequently calculated that is a measure for how much the predict and the measurement are respectively trusted.

$$K(k) = P'(k)H(k)^T \cdot (H(k)P'(k)H(k)^T + R(k))^{-1},$$

Where:

R(k): covariance matrix for the noise that is applied to the measurement values

In the next step, the comparison is now made of measurement and state after the predict step. The pre-estimated position is converted into phase values by $\varphi_{u,n} = -2\pi f_0 \tau'_{u,n}$ and, analog to the measurement vector, the differences are formed for all the (N·(N−1)/2) possible antenna combinations per station and are combined in a vector for all three radars analog to the measured phase differences.

$$\begin{pmatrix} -2\pi f_0(\tau_{1,1} - \tau_{1,2}) \\ \vdots \\ -2\pi f_0(\tau_{1,n} - \tau_{1,m}) \\ \vdots \\ -2\pi f_0(\tau_{1,(N-1)} - \tau_{1,N}) \\ -2\pi f_0(\tau_{2,1} - \tau_{2,2}) \\ \vdots \\ -2\pi f_0(\tau_{2,n} - \tau_{2,m}) \\ \vdots \\ -2\pi f_0(\tau_{2,(N-1)} - \tau_{2,N}) \\ \vdots \\ -2\pi f_0(\tau_{U,1} - \tau_{U,2}) \\ \vdots \\ -2\pi f_0(\tau_{U,n} - \tau_{U,m}) \\ \vdots \\ -2\pi f_0(\tau_{U,(N-1)} - \tau_{U,N}) \end{pmatrix}$$

The predict of state and covariance matrix is now corrected ("update") with the aid of the measurement values and in dependence on the Kalman gain to obtain the new position x(k):

$$x(k) = x'(k) + K(k)\text{mod}'_{2\pi}(z(k) - h(x'(k))),$$

$$P(k) = (I - K(k)H(k)) \cdot P'(k)$$

Where:

z(k): measurement vector h(x'(k)): vector with calculated phase values for the pre-estimated position $\text{mod}'_{2\pi}$: The modulo operation in this case maps the phases to the space $[-\pi, \pi]$ to enable a correction symmetrically in all directions, that is $$\text{mod}'_{2\pi} = \begin{cases} \text{mod}_{2\pi}(\varphi) & \text{for } \text{mod}_{2\pi}(\varphi) < \pi \\ \text{mod}_{2\pi}(\varphi) - 2\pi & \text{for } \text{mod}_{2\pi}(\phi) > \pi \end{cases}.$$

This procedure is now repeated again and again, with the result (x(k), P(k)) from the last pass again forming the starting point for the calculation of the next point.

A start value has to be assumed for the first measurement point for which, as is known, there is no precursor. This start value can be selected randomly, for example. If an assumed start value does not result in a stable adjustment of the filter, the procedure can be repeated with one or more different start values. Another possibility comprises determining a start value on the basis of a different locating method, for instance using the radio location method shown above in the prior art.

It is easily understandable for the skilled person that this method can be used for all wave-based sensors in which there is a relationship between the distance and the phase. It is not important here whether they are coherent signals (e.g. by the pure reflection with primary radar) or also incoherent signals (e.g. secondary radar, in accordance with the LPR principle or radio buoys).

The method can be expanded by merging with data of further sensors. Inertial sensor systems or the control data of robots, automobiles, autonomous vehicles, etc. can thus e.g. also be used for the predict of the position.

The position determination can also take place iteratively in that the method is performed multiple times after one another for one measurement point to more and more approximate the best estimate position.

Any ambiguities that occur (e.g. on an unskillful choice of the differences/sums and of the sensor positions) can be resolved in that the method is applied in parallel to a plurality of hypotheses, e.g. the positions that are present with the greatest probability, such as in the multihypothesis Kalman filter.

Analog to his, the multipaths that occur at the individual antennas can also be estimated in parallel. If the antennas are selected at a sufficient distance, different multipaths are also present at the different antennas.

The method can also be used or expanded for the localization and tracking of a plurality of targets simultaneously. They can here also be resolved in-band due to the sum/difference formation.

The determination of the phase that is subsequently used for the method can e.g. take place by a time frequency transformation (e.g. FFT or Goertzel filter), but also recursively using the previously determined location. If the frequency ranges used for the phase determination, the scan point for the phase evaluation can be recursively determined with the aid of the previously determined location.

Phase directionalities can be incorporated directly on the comparison of phases and signal times of flight in that, for a hypothetical location, the angle with respect to the orientation of the antenna is calculated and a phase offset is calculated from this that is summed from the time of flight of the calculated phase.

The localization in accordance with this method can simultaneously also be used for the calibration of unwanted contributions to phase (e.g. caused by unknown times of flight in the hardware).

The method can be expanded to also estimate the current speed, acceleration, etc. of the object in addition to the position.

The method can be used without problem on modulated signals, e.g. in that the signal is demodulated and the frequency and phase of the carrier are then determined.

Application areas:
Massive MIMO
Robot localization
Asset tracking (RFID)
Vehicle, aircraft, ship tracking
Person tracking
Monitoring of transport paths, production halls
Tool and factory localization
Industry 4.0
Car to car localization
Indoor localization
Internet of things
Medical applications
Possible infrastructures
Existing infrastructure such as wireless LAN, cellular radio, communication systems
Radar technology: CW, FMCW, UWB, OFDM, correlation receivers in general
Acoustics: Ultrasound
Primary radar (pure reflection)
Secondary radar (transponder responds, synchronously or asynchronously)
Beacon (absolutely asynchronously)

The method can be used for the localization of emitting objects whose signal is not in any deterministic frequency and phase relationship with a comparison signal in a receiver unit.

Typical communication systems use homodyne or heterodyne receiver architectures in which the signal of a transmitter is mixed with one or more receiver carrier signals one or more stages, i.e. is offset in the frequencies. It is disadvantageous here for the aim of a localization that the transmission carrier signal is as a rule not coherent with the receiver carrier signals and the received signal phases therefore initially do not permit any conclusion on the distance between the transmitter and the receiver due to this incoherence.

If, however, it is assumed that there is only one constant phase offset and/or one frequency offset, i.e. a linearly varying phase offset and/or another deterministic time dependent phase relationship between the transmission carrier signal and the receiver carrier signals, it is possible in accordance with the invention likewise to estimate this determinism with an expansion of the method in accordance with the invention and thus to improve the localization.

For systems whose transmission and reception signals are incoherent, but the phase difference between the transmitter and receiver $\Phi_s$, however, correlates for measurements at different times, it is advantageous to estimate it. If a plurality of mutually incoherent radio receivers are used, a separate unknown phase term $\Phi_{s,n_p}$ is produced for every station. They are different as a rule and have an unknown temporally varying relationship with one another. Since the phase term of a radio receiver $\Phi_{s,n_p}(k)$ at the time k correlates with the phase term $\Phi_{s,n_p}(k-1)$ via the function $f_\Phi(\cdot)$, the phase term $\Phi_{s,n_p}'(k)$ to be expected can be estimated by $$\Phi_{s,n_p}'(k) = f_\Phi(\Phi_{s,n_p}(k-1)).$$

This information can be used for incoherent systems in that $$\min_{p_x(k),p_y(k),p_z(k),\Phi_{s,n_p}(k)}$$

$$\sum_{n_l=1}^{N} Pe\left(\mathrm{mod}_{2\pi}'\left(b_{n,n_l}\varphi_n - b_{n,n_l}\left[-\omega\frac{\sqrt{\begin{array}{l}(p_x(k)-x_n)^2+\\(p_y(k)-y_n)^2+\\(p_z(k)-z_n)^2\end{array}}}{c}\right] - \Phi_{s,n_p}(k)\right)\right) +$$

$$\sum_{n_p=1}^{N_p} c_{n_p} Pe_\Phi\left(\mathrm{mod}_{2\pi}'\left(\Phi_{s,n_p}(k) - \Phi_{s,n_p}'(k)\right)\right)$$

is recursively minimized. The associated phase $\Phi_{s,n_p}(k)$ is here subtracted in every linear combination $n_l$. $Pe_\Phi$ corresponds to the error function of the phase comparison of the estimated phase $\Phi_{s,n_p}'(k)$ and corrected phase $\Phi_{n_p}(k)$. $c_{n_p}$ corresponds to an arbitrary weighting factor.

The invention claimed is:

1. A locating method for localizing at least one object using wave-based signals, the method comprising:
   a wave field emanates from the object to be localized and the wave field emanating from the object is received by a plurality N receivers;
   at least one measurement signal is formed in each receiver that depends on the spatial and temporal distribution of the wave field and whose phase progression is characteristically influenced by the signal time of flight from the object to the respective receiver,
   wherein phase values for each of the at least two measurement signals are taken as measured phase values for a position localization,
   wherein the current position of the object to be localized is determined at the time k by a comparison of at least one linear combination of the measured phase values with at least one linear combination of the associated hypothetical phase values that result from the transmitter or receiver distance or distances and while using a recursive filter or recursive estimator, and wherein the sums and/or differences of the phase values measured by at least one antenna pair are evaluated together with the measured phase values' associated signal time of flight differences for the recursive position estimate of an object.

2. A method in accordance with claim 1, wherein a wave field emanating from the object is received from one or more receivers and results in coherent measurement signals, with the receiver or receivers receiving the measurement signals at different receiver positions.

3. A method in accordance with claim 1, wherein a plurality of signals of different frequencies emanate from the object and one or more receivers are used that measure phase values for different frequencies and introduce the phase values for different frequencies into the linear combination of the measured phase values for the position localization.

4. A method in accordance with claim 1, wherein an unknown transmission phase of the emitting object is recursively estimated.

5. A method in accordance with claim 1, wherein the wave field emanating from the object is received by one or more receivers at different times, with at least one receiver determining phase values at different times and introducing the phase values at different times into the linear combination of the measured phase values for the position localization.

6. A method in accordance with claim 3, wherein the signals of different frequencies emanating from the object are generated by an object or transponder having a non-linear behavior.

7. A method in accordance with claim 6, wherein the object or transponder comprises at least one transmitter that generates an emanating wave field having a frequency f0, the object to be localized emits a wave field that, due to the non-linearity of the object, comprises multiples of the frequency f0 whose phase values are measured by the one or more receivers.

8. A method in accordance with claim 7, wherein the wave field emanating from the transmitter has at least two frequencies (f1; f2; f3; . . . ; fn) and multiples (n1*f1; n2*f2; n3*f3; . . . ; nn*fn) and intermodulation products (n1*f1+ n2*f2+ . . . +nn*fn; . . . ) are produced by the nonlinearity of the object whose phase values are measured by the at least one receiver.

9. A method in accordance with claim 7, wherein the wave field emanating from the transmitter has at least two frequencies (f1; f2; f3; . . . ; fm), the object produces the frequencies (fm+1, . . . , fn) itself and multiples and intermodulation products whose phase values are measured are produced by the non-linearity.

10. A method in accordance with claim 1, wherein the wave field emanating from the object is produced by reflection of a transmission signal at the object or the object produces the wave field by independent emission of a wave or is produced by an internal signal source of the object.

11. A method in accordance with claim 1, wherein the comparison of the formed linear combinations is evaluated with the aid of the recursive estimator or recursive filter to determine differences to minimize a sum of error functions of the differences for all the selected linear combinations.

12. A method in accordance with claim 9, wherein the linear combinations or the recursive estimator or recursive filter takes account of movement models and/or additional sensor values.

13. A method in accordance with claim 1, wherein an extended Kalman filter, a pseudo linear filter, or a gradient based search, or a brute force search is used as the recursive estimator or recursive filter.

14. A method in accordance with claim 1, wherein errors of the linear combinations of the measured and hypothetical phase values are mapped to a defined value space by a suitable mathematical operation.

15. A method in accordance with claim 1, wherein the position localization takes place in a near field of an antenna arrangement(s) used for the position localization.

16. A method in accordance with claim 1, wherein the method is performed iteratively for a position to be estimated.

17. A method in accordance with claim 1, wherein unknown phase differences $\Phi_{s,n_p}(k)$ between the emitting object and the at least one receiver are recursively estimated.

18. A method in accordance with claim 1, wherein a wavelength is smaller than a maximum distance of two points within a space in which the object to be localized is to be localized.

19. A method in accordance with claim 1, wherein a maximum distance of two points within a space in which the object to be localized is to be localized is larger than a largest uniqueness region that results from the linear combinations that are evaluated by the recursive filter or recursive estimator.

20. A localization system comprising at least one receiver for the position localization of at least one object having means for performing the method in accordance with claim 1.

* * * * *

UNITED STATES PATENT AND TRADEMARK OFFICE
CERTIFICATE OF CORRECTION

| | |
|---|---|
| PATENT NO. | : 11,555,881 B2 |
| APPLICATION NO. | : 17/258550 |
| DATED | : January 17, 2023 |
| INVENTOR(S) | : Melanie Lipka et al. |

It is certified that error appears in the above-identified patent and that said Letters Patent is hereby corrected as shown below:

In the Claims

At Column 20, Lines 36-37, "to be localized is to be localized." should be -- to be localized. --.

At Column 20, Line 41, "to be localized is to be localized" should be -- to be localized --.

Signed and Sealed this
Fifth Day of September, 2023

Katherine Kelly Vidal
*Director of the United States Patent and Trademark Office*